US012745182B2

(12) United States Patent
Nader et al.

(10) Patent No.: US 12,745,182 B2
(45) Date of Patent: Sep. 22, 2026

(54) WIRELESS DEVICE OVERHEATING PROTECTION AND EXCESSIVE ENERGY CONSUMPTION PREVENTION/MITIGATION

(71) Applicant: Telefonaktiebolaget LM Ericsson (publ), Stockholm (SE)

(72) Inventors: Ali Nader, Malmö (SE); Sebastian Faxér, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 303 days.

(21) Appl. No.: 18/690,939

(22) PCT Filed: Sep. 13, 2022

(86) PCT No.: PCT/EP2022/075415
§ 371 (c)(1),
(2) Date: Mar. 11, 2024

(87) PCT Pub. No.: WO2023/037007
PCT Pub. Date: Mar. 16, 2023

(65) Prior Publication Data

US 2024/0406872 A1 Dec. 5, 2024

Related U.S. Application Data

(60) Provisional application No. 63/243,501, filed on Sep. 13, 2021.

(51) Int. Cl.
*H04W 52/02* (2009.01)
*H04B 7/0413* (2017.01)
*H04W 76/25* (2018.01)

(52) U.S. Cl.
CPC ...... *H04W 52/0251* (2013.01); *H04B 7/0413* (2013.01); *H04W 76/25* (2018.02)

(58) Field of Classification Search
CPC ............... H04B 7/0404; H04B 7/0413; H04W 52/0251; H04W 76/25; H04W 52/028; Y02D 30/70
See application file for complete search history.

(56) References Cited

U.S. PATENT DOCUMENTS 8,086,229 B2 12/2011 Lindoff et al.
8,594,694 B2 11/2013 Lindoff et al.
(Continued)

FOREIGN PATENT DOCUMENTS

EP 3556125 B1 6/2021
WO 2020192782 A1 10/2020
WO 2021030422 A1 2/2021

OTHER PUBLICATIONS

ETSI TS 138 331 V15.15.0 Technical Specification; 5G; NR; Radio Resource Control (RRC); Protocol specification (3GPP TS 38.331 version 15.15.0 Release 15); Oct. 2021; consisting of 535 pages.
(Continued)

*Primary Examiner* — Khoa Huynh
(74) *Attorney, Agent, or Firm* — Weisberg I.P. Law, P.A.

(57) ABSTRACT

A method, system and apparatus are disclosed. According to one or more embodiments, a wireless device configured to communicate with a network node is provided. The wireless device includes processing circuitry configured to detect a condition related to one of energy consumption and overheating at the wireless device and, in response to the detected condition, indicate one of a first number of sounding reference signal, SRS, ports and a first rank indicator, RI, value, where the first number of SRS ports is less than an actual number of SRS ports usable by the wireless device for a first upcoming communication, and where the first RI value is less than an actual RI value determined by the wireless device based on a first measurement.

22 Claims, 9 Drawing Sheets

(56) References Cited

U.S. PATENT DOCUMENTS

| | | | | |
|---|---|---|---|---|
| 2009/0215442 | A1 | 8/2009 | Lindoff et al. | |
| 2012/0064909 | A1 | 3/2012 | Lindoff et al. | |
| 2018/0199185 | A1 | 7/2018 | Tenny et al. | |
| 2020/0106674 | A1* | 4/2020 | Van Der Velde ..... | H04W 24/10 |
| 2020/0351771 | A1 | 11/2020 | Geekie et al. | |
| 2021/0051585 | A1 | 2/2021 | Kim et al. | |
| 2022/0022223 | A1* | 1/2022 | Yang .................... | H04B 7/0404 |

OTHER PUBLICATIONS

International Search Report and Written Opinion dated Jan. 30, 2023 for International Application No. PCT/EP2022/075415 filed Sep. 13, 2022; consisting of 10 pages.

3GPP TSG-RAN WG2 Meeting #99 R2-1708978; Title: UE overheating problem; Agenda item: 8.25; Source: Qualcomm Incorporated; Document for: Discussion; Date and Location: Aug. 21-25, 2017, Berlin, Germany; consisting of 5 pages.

* cited by examiner

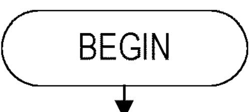

Receive one of a sounding reference signal, SRS, reporting on a first number of SRS ports where the first number of SRS ports is lower than a second number of SRS ports that are supported by the wireless device, and a rank indicator, RI, reporting that indicates a first rank where the first rank is lower than a second rank measured by the wireless device
S134

Perform at least one action based at least on one of the SRS reporting and RI reporting
S136

END

FIG. 9

BEGIN

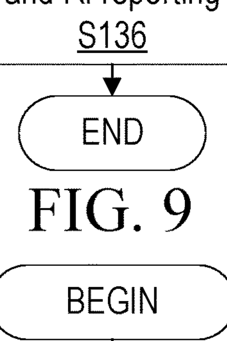

Receive an indication of one of a first number of sounding reference signal, SRS, ports and a first rank indicator, RI, value, where the first number of SRS ports is less than an actual number of SRS ports usable by the wireless device for a first upcoming communication, and where the first RI value is less than an actual RI value associated with a first measurement of the wireless device
S138

Reduce a number of the plurality of MIMO layers for the first upcoming communication in response to the indication of one of the first number of SRS ports and the first RI value, where the indication of one of the first number of SRS ports and the first RI value is associated with a condition related to one of energy consumption and overheating existing at the wireless device
S140

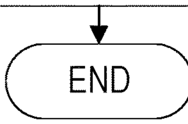

FIG. 10

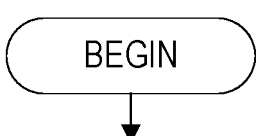

Detect a condition related to one of energy consumption and overheating at the wireless device
S142

Cause one of SRS reporting on a first number of SRS ports where the first number of SRS ports is lower than a second number of SRS ports that are supported by the wireless device and rank indicator, RI, reporting that indicates a first rank where the first rank is lower than a second rank measured by the wireless device
S144

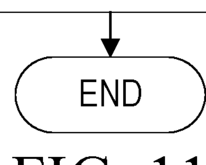

FIG. 11

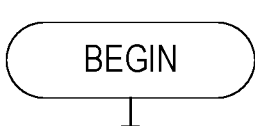

Detect a condition related to one of energy consumption and overheating at the wireless device
S146

In response to the detected condition, indicate one of a first number of sounding reference signal, SRS, ports and a first rank indicator, RI, value, where the first number of SRS ports is less than an actual number of SRS ports usable by the wireless device for a first upcoming communication, and where the first RI value is less than an actual RI value determined by the wireless device based on a first measurement
S148

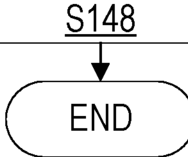

FIG. 12

WIRELESS DEVICE OVERHEATING PROTECTION AND EXCESSIVE ENERGY CONSUMPTION PREVENTION/MITIGATION

CROSS-REFERENCE TO RELATED APPLICATIONS

This application is a Submission Under 35 U.S.C. § 371 for U.S. National Stage Patent Application of International Application No.: PCT/EP2022/075415, filed Sep. 13, 2022 entitled "WIRELESS DEVICE OVERHEATING PROTECTION AND EXCESSIVE ENERGY CONSUMPTION PREVENTION/MITIGATION," which claims priority to U.S. Provisional Application No. 63/243,501, filed Sep. 13, 2021, entitled "WIRELESS DEVICE OVERHEATING PROTECTION AND EXCESSIVE ENERGY CONSUMPTION PREVENTION/MITIGATION," the entireties of both of which are incorporated herein by reference.

TECHNICAL FIELD

The present disclosure relates to wireless communication, and in particular, to mitigating an overheating and/or excessive energy consumption condition.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Wireless Device Energy Consumption and Overheating

Wireless device energy consumption is a metric that is worthy of consideration. In general, significant energy can be spent by the wireless device during a connection to the network node, especially when the wireless device is processing and maintaining multiple transceiver chains at high traffic load and/or when a plurality of Multiple Input Multiple Output (MIMO) layers are configured. Such energy consumption may occasionally lead to an overheating condition in the wireless device where the temperature of one or more components exceeds a temperature threshold. If such a condition is not remedied by the network node, the wireless device may not operate well and may eventually have to disconnect from the network node in order to remedy the condition itself. Techniques that can alleviate the wireless device's overheating condition while in connected mode can be beneficial to the end user being able to maintain a connection even though at a lower data rate.

Wireless Device Assistance Information

In 3GPP (e.g., Technical Specification (TS) 38.331 Rel-15, et seq.) methods are defined for mitigating a potential wireless device overheating condition. The network node may optionally choose to configure a wireless device and allow it to report an overheating condition. Such configuration is performed via an Overheating Assistance Configuration, for example:

OverheatingAssitanceConfig (Network Node to wireless device)

```
OverheatingAssistanceConfig ::= SEQUENCE {
  overheatingIndicationProhibitTimer ENUMERATED {s0, s0dot5, s1, s2, s5, s10, s20, s30,
    s60, s90, s120, s300, s600, spare3, spare2, spare1} }
```

If configured, the wireless device may report a potential overheating condition to the network node. In order to avoid excessive signaling, the network node also configures the wireless device with a prohibit timer (overheatingIndicationProhibitTimer) ranging up to 600 seconds. Once the wireless device has reported a condition (either overheated, or no longer overheated), the wireless device starts a corresponding timer during which the wireless device does not report a new condition (overheated, or no longer overheated). The condition itself is reported by the wireless device to the network node via a wireless device Assistance Information message, for example:

UEAssistanceInformation message (UE (i.e., wireless device) to Network Node)

```
UEAssistanceInformation ::=          SEQUENCE {
  criticalExtensions                 CHOICE {
    ueAssistanceInformation              UEAssistanceInformation-IEs,
    criticalExtensionsFuture           SEQUENCE { }
  }
}
UEAssistanceInformation-IEs ::=        SEQUENCE {
  delayBudgetReport                  DelayBudgetReport                 OPTIONAL,
  lateNonCriticalExtension             OCTET STRING                      OPTIONAL,
  nonCriticalExtension               UEAssistanceInformation-v1540-IEs      OPTIONAL
}
...
UEAssistanceInformation-v1540-IEs ::= SEQUENCE {
  overheatingAssistance                OverheatingAssistance               OPTIONAL,
  nonCriticalExtension               UEAssistanceInformation-v16xy-IEs      OPTIONAL
```

-continued

| UEAssistanceInformation message (UE (i.e., wireless device) to Network Node) |
|---|

```
}
OverheatingAssistance ::=          SEQUENCE {
  reducedMaxCCs                    SEQUENCE {
    reducedCCsDL                   INTEGER (0..31),
    reducedCCsUL                   INTEGER (0..31)
  } OPTIONAL,
  reducedMaxBW-FR1                   SEQUENCE {
    reducedBW-FR1-DL                 ReducedAggregatedBandwidth,
    reducedBW-FR1-UL                 ReducedAggregatedBandwidth
  } OPTIONAL,
  reducedMaxBW-FR2                   SEQUENCE {
    reducedBW-FR2-DL                 ReducedAggregatedBandwidth,
    reducedBW-FR2-UL                 ReducedAggregatedBandwidth
  } OPTIONAL,
  reducedMaxMIMO-LayersFR1             SEQUENCE {
    reducedMIMO-LayersFR1-DL             MIMO-LayersDL,
    reducedMIMO-LayersFR1-UL             MIMO-LayersUL
  } OPTIONAL,
  reducedMaxMIMO-LayersFR2             SEQUENCE {
    reducedMIMO-LayersFR2-DL             MIMO-LayersDL,
    reducedMIMO-LayersFR2-UL             MIMO-LayersUL
  } OPTIONAL
}
```

As indicated in bold above, the wireless device may suggest various actions to the network node when it reports an overheating condition.

Precoding

Multi-antenna techniques can significantly increase the data rates and reliability of a wireless communication system. The performance may be improved if both the transmitter and the receiver are equipped with multiple antennas, resulting in a multiple-input multiple-output (MIMO) communication channel. Such systems and/or related techniques are commonly referred to as MIMO.

The NR standard is currently evolving with enhanced MIMO support. A core component in NR is the support of MIMO antenna deployments and MIMO related techniques such as spatial multiplexing. The spatial multiplexing mode is aimed for high data rates in favorable channel conditions. An illustration of an example of the spatial multiplexing operation is provided in FIG. 1.

As illustrated in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. For codebook-based beamforming, the precoder matrix is selected from a codebook of possible precoder matrices, and typically indicated by means of a precoder matrix indicator (PMI), which specifies a unique precoder matrix in the codebook for a given number of symbol streams.

With reciprocity-based beamforming, the downlink channel state is instead acquired by sounding the uplink channel by the wireless device transmitting a Sounding Reference Signal (SRS). By utilizing that the uplink propagation channel is reciprocal since the uplink and downlink is on the same frequency in a TDD system, the downlink channel state can be estimated from the uplink (while the propagation channel is reciprocal, the channel effects due to RX/TX processing is generally not, so calibration between the UL and DL chains may be required for reciprocity-based beamforming to work). Since wireless devices typically are equipped with only one or two Tx chains while four Rx antennas are typically used, the wireless device may need to support SRS Tx switching, which is a special kind of SRS transmission.

The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

$N_R$ uses OFDM in the downlink (and DFT pre-coded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in channel dependent precoding. This is also commonly referred to as closed-loop precoding and essentially strives for focusing the transmit energy into a subspace which is strong in the sense of conveying much of the transmitted energy to the wireless device.

In closed-loop precoding for the NR downlink, the wireless device transmits, based on channel measurements in the forward link (downlink), recommendations to the network node of a suitable precoder to use. The network node configures the wireless device to provide feedback according to CSI-ReportConfig and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per sub-band. This is an example of the more general case of channel state information (CSI) feedback, which also encompasses feeding back other information than recommended precoders to assist the network node in subsequent transmissions to the wireless device. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each sub-band, which is defined as a number of contiguous resource blocks ranging between 4-32 PRBS depending on the band width part (BWP) size.

Given the CSI feedback from the wireless device, the network node determines the transmission parameters it wishes to use to transmit to the wireless device, including the precoding matrix, transmission rank, and modulation and coding scheme (MCS). These transmission parameters may differ from the recommendations the wireless device makes. The transmission rank, and thus the number of spatially multiplexed layers, is reflected in the number of columns of the precoder W. For efficient performance, it is important that a transmission rank matching the channel properties is selected.

Channel State Information Reference Signals (CSI-RS)

For CSI measurement and feedback, CSI-RSs are defined. A CSI-RS is transmitted on each transmit antenna (or antenna port) and is used by a wireless device to measure downlink channel between each of the transmit antenna ports and each of its receive antenna ports. The antenna ports are also referred to as CSI-RS ports. The supported number of antenna ports in NR are {1,2,4,8,12,16,24,32}. By measuring the received CSI-RS, a wireless device can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. FIG. 2 illustrates an example of CSI-RS REs for 12 antenna ports, where 1RE per RB per port is shown.

In addition, interference measurement resource (IMR) is also defined in NR for a wireless device to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a wireless device can estimate the effective channel and noise plus interference to determine the CSI, i.e. rank, precoding matrix, and the channel quality.

Furthermore, a wireless device in NR may be configured to measure interference based on one or multiple NZP CSI-RS resource.

CSI Framework in NR

In NR, a wireless device can be configured with multiple CSI reporting settings and multiple CSI-RS resource settings. Each resource setting can contain multiple resource sets, and each resource set can contain up to 8 CSI-RS resources. For each CSI reporting setting, a wireless device feeds back a CSI report.

Each CSI reporting setting contains at least the following information:

- A CSI-RS resource set for channel measurement
- An IMR resource set for interference measurement
- Optionally, a CSI-RS resource set for interference measurement
- Time-domain behavior, i.e., periodic, semi-persistent, or aperiodic reporting
- Frequency granularity, i.e., wideband or subband
- CSI parameters to be reported such as RI, PMI, CQI, and CSI-RS resource indicator (CRI) in case of multiple CSI-RS resources in a resource set
- Codebook types, i.e., type I or II, and codebook subset restriction
- Measurement restriction
- Subband size. One out of two possible subband sizes is indicated, the value range depends on the bandwidth of the BWP. One CQI/PMI (if configured for subband reporting) is fed back per subband).

When the CSI-RS resource set in a CSI reporting setting contains multiple CSI-RS resources, one of the CSI-RS resources is selected by a wireless device and a CSI-RS resource indicator (CRI) is also reported by the wireless device to indicate to the network node about the selected CSI-RS resource in the resource set, together with RI, PMI and CQI associated with the selected CSI-RS resource.

For aperiodic CSI reporting in NR, more than one CSI reporting settings, each with a different CSI-RS resource set for channel measurement and/or resource set for interference measurement can be configured and triggered at the same time. In this case, multiple CSI reports are aggregated and sent from the wireless device to the network node in a single PUSCH.

SRS Transmission

If requested by the network node, SRS (Sounding Reference Signal) is transmitted by the wireless device according to network node instructions. More specifically, the wireless device can be configured to transmit the SRS for a specific cell/carrier and BWP from 1, 2, or 4 antenna ports in a periodic (RRC configured), aperiodic (triggered by DCI), or a semi-persistent (triggered via MAC-CE) manner. Based on the SRS, the network node measures the uplink propagation channel.

SRS resources in NR are grouped in SRS resource sets, which comprise one or more SRS resource. An SRS resource set has a specific usage={beamManagement, codebook, nonCodebook, antennaSwitching}, with a specific set of rules that apply. SRS with usage equal to antennaSwitching is used for DL CSI acquisition purpose for reciprocity-based beamforming, i.e., the network node may assume that the SRS channel in the UL is reciprocal to the downlink and may thereupon derive the precoding and rank selection to use in the downlink. At most two of such sets can be defined in NR and each set contains only one SRS resource for the case of non-antenna switching. For aperiodic SRS resource sets, each set is associated with an aperiodic slot offset k, according to the RRC parameter slotOffset. SRS reporting can be used in both codebook based and non-codebook-based transmissions.

The Overheating Assistance framework described above is optional for the network node to implement or configure. If not configured or not implemented by the network node, the wireless device may not indicate an overheating condition. Even if configured by the network node, the wireless device may not report a change in the associated condition or suggest new actions to be taken by the network node to mitigate the wireless device overheating issue. For example, if the wireless device has requested a decrease in number of component carriers (reducedMaxCC's), and the network node has adopted the suggestion, the wireless device may not ask for more actions (e.g., reduction of MIMO layers) during the course of running a prohibit timer. Then the wireless device may not either inform the network node that it is no longer overheated while the prohibit timer is running during which time a wireless device is running with an unnecessarily under dimensioned configuration. Furthermore, even if the network node has implemented and configured the wireless device to report overheating condition, it may not have implemented parts of the action related to overheating. For example, the network node may have support for adapting the number of component carriers based on suggestion from the wireless device, but not support adapting the number of MIMO layers as suggested by the wireless device.

Therefore, existing methods and mechanisms fail to adequately address certain scenarios such as when the wireless device can alleviate its overheating condition under the above circumstances, i.e., when wireless device assistance framework is not implemented by a network node or not configured, while a prohibit timer is running, or when the wireless device detects that the network node will not/has not adapted the number of MIMO layers despite the wireless device's proposal.

SUMMARY

Some embodiments advantageously provide methods, systems, and apparatuses for mitigating an overheating and/or excessive energy consumption condition.

In situations where the wireless device is close to running out of power or alternately being overheated, the wireless device, if configured to report rank indicator or transmit SRS, may report a lower rank than actually perceived and transmits SRS on fewer ports than actually configured for, for example. As such, the wireless device indicates to that the network node to lower the number of MIMO layers compared to actual conditions if the wireless device would have reported the actual perceived values and on transmitted the configured number of SRS ports. The wireless device may perform such behavior individually/differently per cell in case of carrier aggregation. As a result, the wireless device may save power or mitigate its overheating condition as fewer transceiver chains and less processing power can be used during the connection while still being able to maintain the connection. In cases where the wireless device observes that the overheating condition is no longer present or relevant, the wireless device switches back to reporting the actual perceived rank and transmit SRS on actual number of configured ports instead of reporting a lower rank and/or transmitting SRS on fewer ports.

According to one aspect of the present disclosure, a wireless device configured to communicate with a network node is provided. The wireless device includes processing circuitry configured to detect a condition related to one of energy consumption and overheating at the wireless device and, in response to the detected condition, indicate one of a first number of sounding reference signal, SRS, ports and a first rank indicator, RI, value. The first number of SRS ports is less than an actual number of SRS ports usable by the wireless device for a first upcoming communication. The first RI value is less than an actual RI value determined by the wireless device based on a first measurement.

According to one or more embodiments of this aspect, the indication of one of the first number of SRS ports and the first RI value is configured to cause the network node to reduce a number of the plurality of MIMO layers for the first upcoming communication without the indication of one of the first number of SRS ports and the first RI value notifying the network node of the detected condition.

According to one or more embodiments of this aspect, the processing circuitry is further configured to determine that the detected condition no longer exists and, in response at least to determining that the detected condition no longer exists, indicate one of an actual number of SRS ports usable by the wireless device for a second upcoming communication and an actual RI value determined by the wireless device based on a second measurement.

According to one or more embodiments of this aspect, the wireless device is configured to remain in radio resource control, RRC, connected mode as long as the condition persists.

According to one or more embodiments of this aspect, the processing circuitry is further configured to indicate the overheating condition to the network node via User Equipment Assistance Information, UAI, and trigger a prohibit timer based on the indication of the overheating condition via UAI. While running, the prohibit timer is configured to prohibit the wireless device from indicating one of that the overheating condition is no longer detected and the overheating condition is still detected. The indication of one of the first number of SRS ports and the first RI value is transmitted separately from the UAI and while the prohibit timer is running.

According to one or more embodiments of this aspect, the processing circuitry is further configured to indicate one of a second number of SRS ports less than an actual number of SRS ports usable by the wireless device for the first upcoming communication and a second RI value less than an actual RI value determined by the wireless device based on the first measurement. The one of the first number of SRS ports and a first RI value being associated with a first component carrier. The one of the second number of SRS ports and a second RI value is associated with a second component carrier different from the first component carrier and less than the one of the first number of SRS ports and the first RI value. The second component carrier is configured to consume more energy than the first component carrier.

According to one or more embodiments of this aspect, the processing circuitry is further configured to adapt at least one scheduled Physical Uplink Shared Channel, PUSCH, transmission based on the detected condition. The adapting of the at least one scheduled PUSCH transmission corresponds to one of omitting a PUSCH transmission and transmitting a second PUSCH layer that includes a Demodulation Reference Signal, DMRS, layer.

According to another aspect of the present disclosure, a method implemented by a wireless device that is configured to communicate with a network node is provided. A condition related to one of energy consumption and overheating at the wireless device is detected. In response to the detected condition, one of a first number of sounding reference signal, SRS, ports and a first rank indicator, RI, value is indicated. The first number of SRS ports is less than an actual number of SRS ports usable by the wireless device for a first upcoming communication. The first RI value is less than an actual RI value determined by the wireless device based on a first measurement.

According to one or more embodiments of this aspect, the indication of one of the first number of SRS ports and the first RI value is configured to cause the network node to reduce a number of the plurality of MIMO layers for the first upcoming communication without the indication of one of the first number of SRS ports and the first RI value notifying the network node of the detected condition.

According to one or more embodiments of this aspect, a determination is performed that the detected condition no longer exists. In response at least to determining that the detected condition no longer exists, indicating one of an actual number of SRS ports usable by the wireless device for a second upcoming communication and an actual RI value determined by the wireless device based on a second measurement.

According to one or more embodiments of this aspect, the wireless device is configured to remain in radio resource control, RRC, connected mode as long as the condition persists.

According to one or more embodiments of this aspect, the overheating condition is indicated to the network node via User Equipment Assistance Information, UAI. A prohibit timer is triggered based on the indication of the overheating condition via UAI. While running, the prohibit timer is configured to prohibit the wireless device from indicating one of that the overheating condition is no longer detected and the overheating condition is still detected. The indication of one of the first number of SRS ports and the first RI value being transmitted separately from the UAI and while the prohibit timer is running.

According to one or more embodiments of this aspect, one of the following is indicated: a second number of SRS ports less than an actual number of SRS ports usable by the wireless device for the first upcoming communication and a second RI value less than an actual RI value determined by the wireless device based on the first measurement. The one of the first number of SRS ports and a first RI value is associated with a first component carrier. The one of the second number of SRS ports and a second RI value is associated with a second component carrier different from the first component carrier and less than the one of the first number of SRS ports and the first RI value. The second component carrier is configured to consume more energy than the first component carrier.

According to one or more embodiments of this aspect, at least one scheduled Physical Uplink Shared Channel, PUSCH, transmission is adapted based on the detected condition. The adapting of the at least one scheduled PUSCH transmission corresponds to one of omitting a PUSCH transmission and transmitting a second PUSCH layer that includes a Demodulation Reference Signal, DMRS, layer.

According to another aspect of the present disclosure, a network node configured to communicate with a wireless device using a plurality of Multiple-Input Multiple-Output, MIMO, layers is provided. The network node includes processing circuitry configured to receive an indication of one of a first number of sounding reference signal, SRS, ports and a first rank indicator, RI, value. The first number of SRS ports is less than an actual number of SRS ports usable by the wireless device for a first upcoming communication. The first RI value is less than an actual RI value associated with a first measurement of the wireless device. The processing circuitry is further configured to reduce a number of the plurality of MIMO layers for the first upcoming communication in response to the indication of one of the first number of SRS ports and the first RI value. The indication of one of the first number of SRS ports and the first RI value is associated with a condition related to one of energy consumption and overheating existing at the wireless device.

According to one or more embodiments of this aspect, the processing circuitry is further configured to receive an indication of one of an actual number of SRS ports usable by the wireless device for a second upcoming communication and an actual RI value determined by the wireless device based on a second measurement. The indication of the one of the actual number of SRS ports and the actual RI value is based on the condition no longer existing at the wireless device.

According to one or more embodiments of this aspect, the processing circuitry is further configured to receive an indication of the overheating condition via User Equipment Assistance Information, UAI. The UAI is associated with a prohibit timer that, while running, is configured to prevent communication that one of the overheating condition is no longer detected and the overheating condition still detected. The indication of one of the first number of SRS ports and the first RI value is received separately from the UAI and while the prohibit timer is running.

According to one or more embodiments of this aspect, the processing circuitry is further configured to receive an indication of one of a second number of SRS ports less than an actual number of SRS ports usable by the wireless device for the first upcoming communication and a second RI value less than an actual RI value associated with a first measurement of the wireless device. The processing circuitry is further configured to configure a first component carrier based on the one of the first number of SRS ports and a first RI value. The processing circuitry is further configured to configure a second component carrier based on the one of the second number of SRS ports and a second RI value. The second component carrier is different from the first component carrier and configured to consume more energy than the first component carrier. The one of the second number of SRS ports and the second RI value is less than one of the first number of SRS ports and the first RI value.

According to one or more embodiments of this aspect, the processing circuitry is further configured to: schedule a Physical Uplink Shared Channel, PUSCH, transmission for the wireless device. The processing circuitry is further configured to one of fail to receive the scheduled PUSCH transmission and receive a PUSCH transmission that has been adapted from the scheduled PUSCH transmission based on the condition existing at the wireless device. The adapting of the scheduled PUSCH transmission corresponds to including a second PUSCH layer that includes a Demodulation Reference Signal, DMRS.

According to another aspect of the present disclosure, a method implemented by a network node that is configured to communicate with a wireless device using a plurality of Multiple-Input Multiple-Output, MIMO, layers is provided. An indication is received of one of a first number of sounding reference signal, SRS, ports and a first rank indicator, RI, value. The first number of SRS ports is less than an actual number of SRS ports usable by the wireless device for a first upcoming communication. The first RI value is less than an actual RI value associated with a first measurement of the wireless device. A number of the plurality of MIMO layers is reduced for the first upcoming communication in response to the indication of one of the first number of SRS ports and the first RI value. The indication of one of the first number of SRS ports and the first RI value is associated with a condition related to one of energy consumption and overheating existing at the wireless device.

According to one or more embodiments of this aspect, an indication is received of one of an actual number of SRS ports usable by the wireless device for a second upcoming communication and an actual RI value determined by the wireless device based on a second measurement. The indication of the one of the actual number of SRS ports and the actual RI value is based on the condition no longer existing at the wireless device.

According to one or more embodiments of this aspect, an indication is received of the overheating condition via User Equipment Assistance Information, UAI. The UAI is associated with a prohibit timer that, while running, is configured to prevent communication that one of the overheating condition is no longer detected and the overheating condition still detected. The indication of one of the first number of SRS ports and the first RI value is received separately from the UAI and while the prohibit timer is running.

According to one or more embodiments of this aspect, an indication is received of one of a second number of SRS ports less than an actual number of SRS ports usable by the wireless device for the first upcoming communication and a second RI value less than an actual RI value associated with a first measurement of the wireless device. A first component carrier is configured based on the one of the first number of SRS ports and a first RI value. A second component carrier is configured based on the one of the second number of SRS ports and a second RI value. The second component carrier is different from the first component carrier and configured to consume more energy than the first component carrier. The one of the second number of SRS ports and the second RI value is less than one of the first number of SRS ports and the first RI value.

According to one or more embodiments of this aspect, a Physical Uplink Shared Channel, PUSCH, transmission is scheduled for the wireless device. One of failing to receive the scheduled PUSCH transmission and receiving a PUSCH transmission that has been adapted from the scheduled PUSCH transmission based on the condition existing at the wireless device. The adapting of the scheduled PUSCH transmission corresponds to including a second PUSCH layer that includes a Demodulation Reference Signal, DMRS.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart of an example process in a network node according to some embodiments of the present disclosure;

FIG. 10 is a flowchart of another example process in a network node according to some embodiments of the present disclosure;

FIG. 11 is a flowchart of an example process in a wireless device according to some embodiments of the present disclosure;

FIG. 12 is a flowchart of another example process in a wireless device according to some embodiments of the present disclosure.

DETAILED DESCRIPTION

Figure 1:
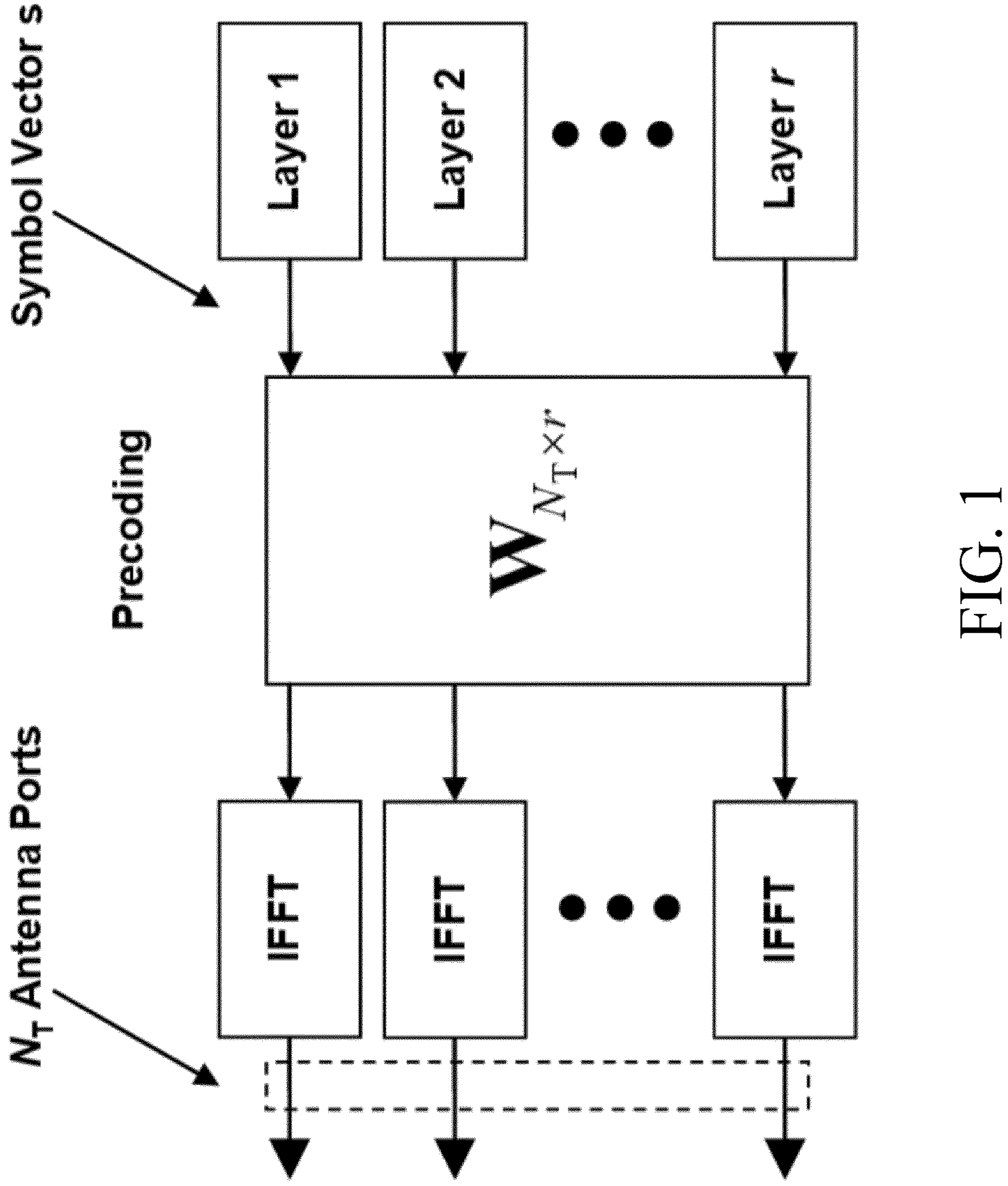
FIG. 1 is a diagram of a transmission structure of precoded spatial multiplexing mode in NR.
Figure 2:
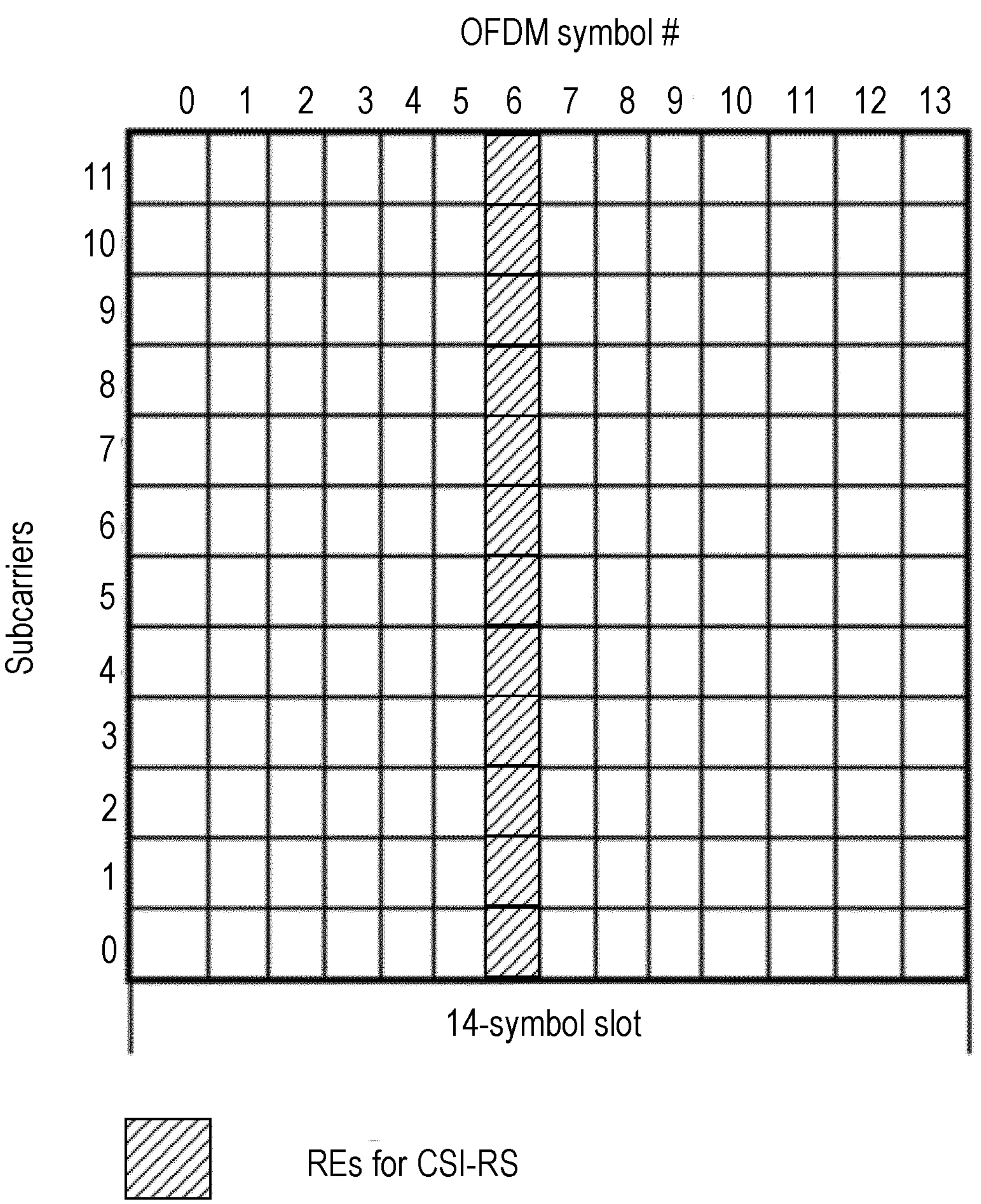
FIG. 2 is a diagram of a RE allocation for 12 port CSI-RS in NR.

While some existing systems may address the overheating condition in the wireless device using a CQI reporting framework related to carrier aggregation including multiple component carriers. One or more embodiments described herein focus in the area of overheating caused by MIMO with or without other component carriers and without adapting the CQI reporting in the wireless device.

Before describing in detail example embodiments, it is noted that the embodiments reside primarily in combinations of apparatus components and processing steps related to mitigating an overheating and/or excessive energy consumption condition.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide mitigating an overheating and/or excessive energy consumption condition.

Figure 3:
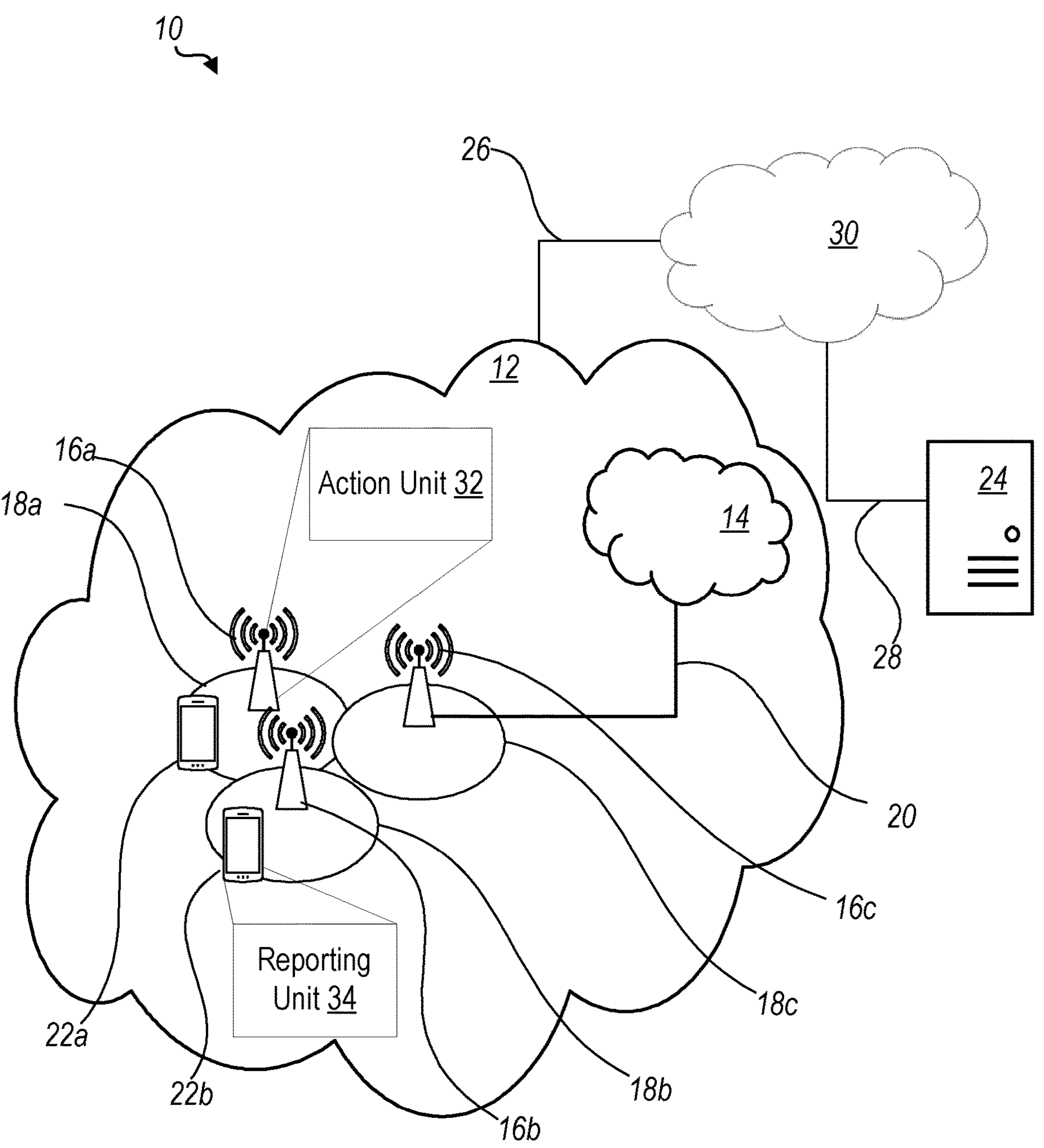
FIG. 3 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an action unit 32 which is configured to perform one or more network node 16 functions as described herein. A wireless device 22 is configured to include a reporting unit 34 which is configured to perform one or more wireless device 22 functions as described herein.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to analyze, store, determine, forward, receive, relay, etc., information related to mitigating an overheating and/or excessive energy consumption condition at the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include action unit 32 configured to perform one or more network node 16 functions as described herein such as with respect to mitigating an overheating and/or excessive energy consumption condition at the wireless device 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a reporting unit 34 configured to perform one or more wireless device 22 functions as described herein such as with respect to mitigating an overheating and/or excessive energy consumption condition.

Figure 4:
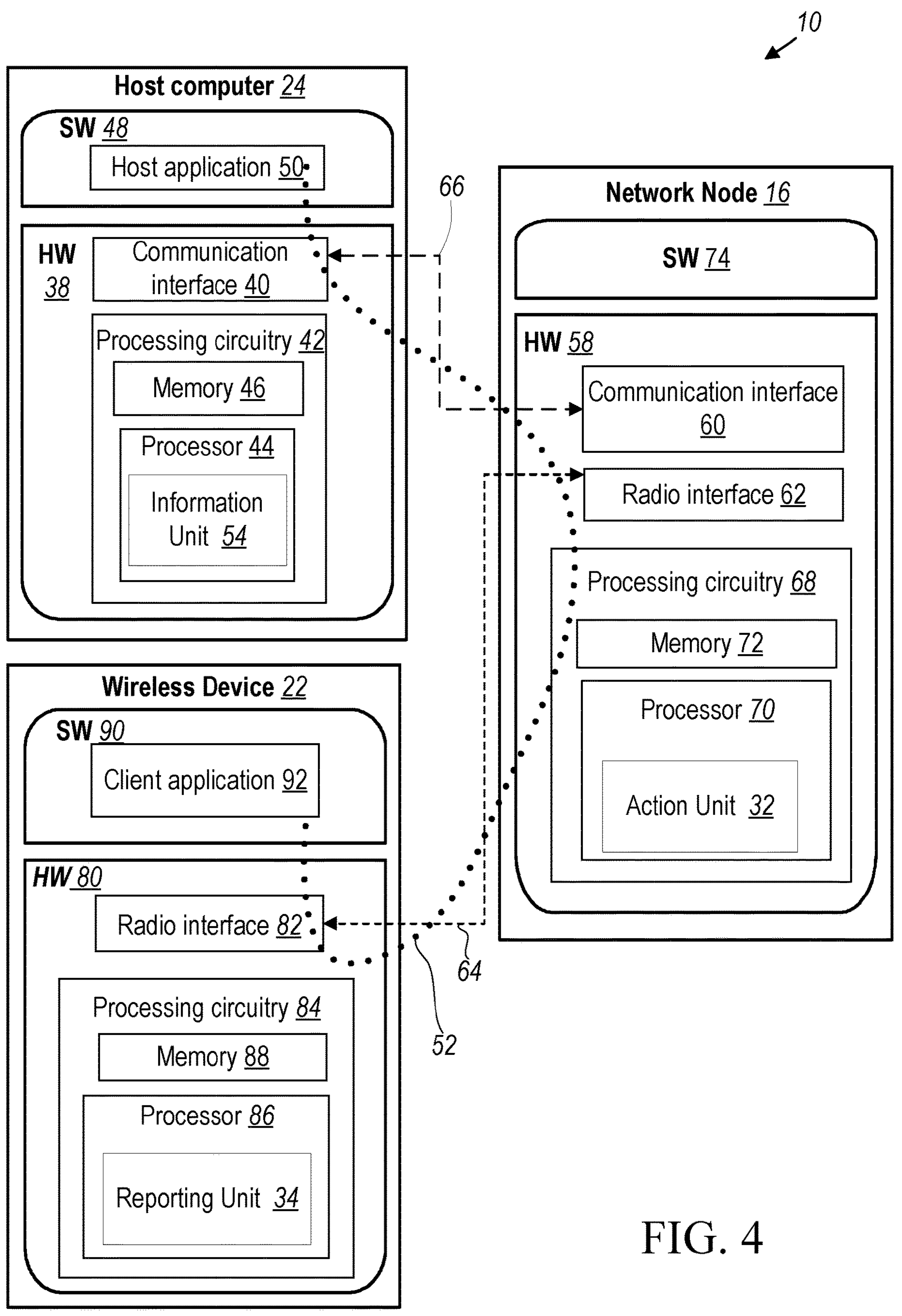
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as action unit 32, and reporting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
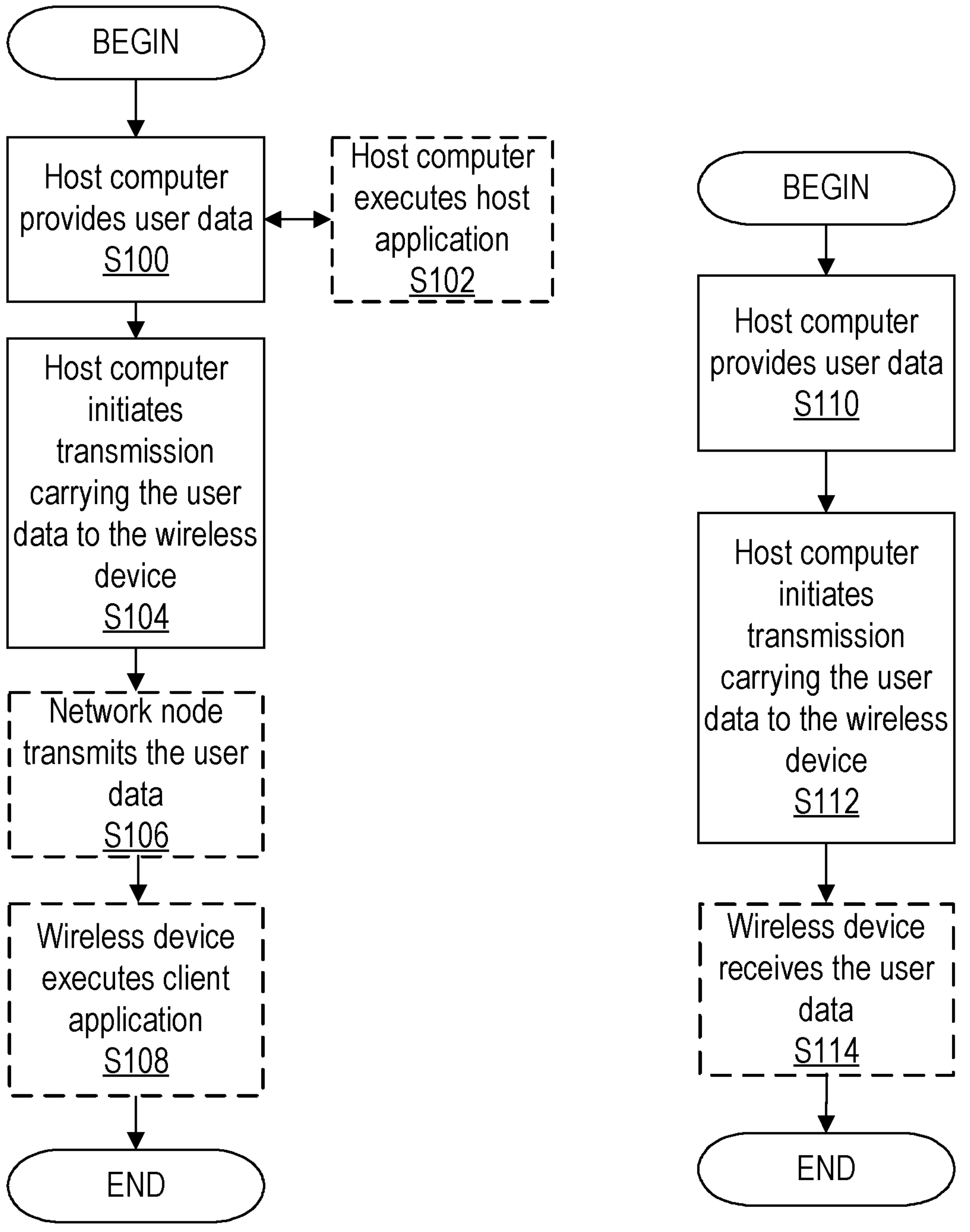
FIG. 5 is a flowchart illustrating example methods implemented in a communication system including a host computer, a network node and a wireless device for executing a client application at a wireless device according to some embodiments of the present disclosure.
FIG. 6 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
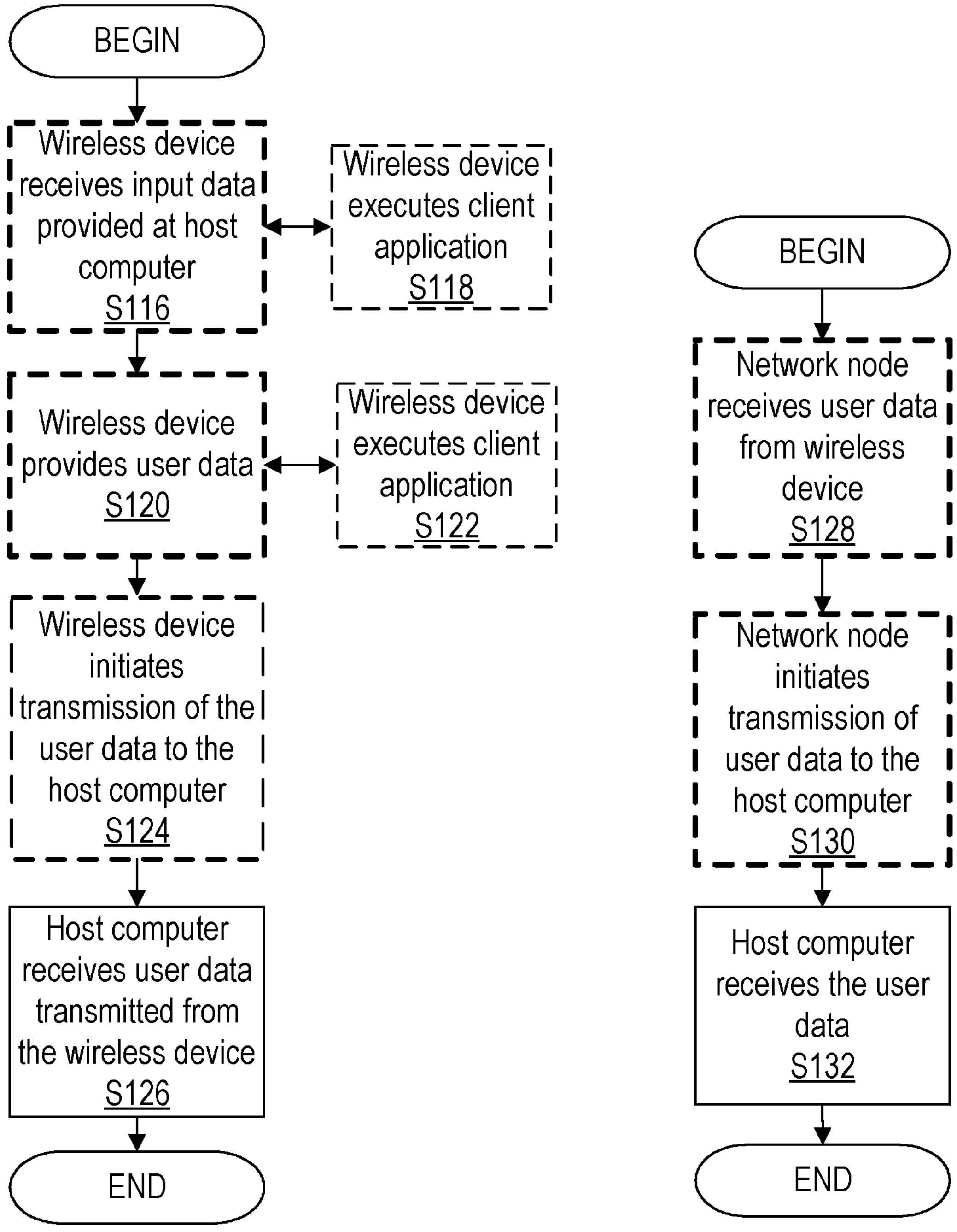
FIG. 7 is a flowchart illustrating example methods implemented in a communication system including a host computer, a network node and a wireless device for receiving user data from the wireless device at a host computer according to some embodiments of the present disclosure.
FIG. 8 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 9 is a flowchart of an example process in a network node 16 according to some embodiments of the present disclosure. One or more blocks described herein may be performed by one or more elements of network node 16 such as by one or more of processing circuitry 68 (including the action unit 32), processor 70, radio interface 62 and/or communication interface 60. Network node 16 is configured to receive (Block S134) one of a sounding reference signal, SRS, reporting on a first number of SRS ports where the first number of SRS ports is lower than a second number of SRS ports that are supported by the wireless device 22 and a rank indicator, RI, reporting that indicates a first rank where the first rank is lower than a second rank measured by the wireless device 22, as described herein. Network node 16 is configured to perform (Block S136) at least one action based at least on one of the SRS reporting and RI reporting, as described herein.

According to one or more embodiments, the at least one action includes modifying a number of configured multiple-input multiple output, MIMO, layers. According to one or more embodiments, the network node 16 remains connected to the wireless device 22 via radio resource control, RRC, connected mode after receiving the one of SRS reporting and RI reporting.

FIG. 10 is a flowchart of another example process in a network node 16 according to some embodiments of the present disclosure. One or more blocks described herein may be performed by one or more elements of network node 16 such as by one or more of processing circuitry 68 (including the action unit 32), processor 70, radio interface 62 and/or communication interface 60. Network node 16 is configured to receive (Block S138) an indication of one of a first number of sounding reference signal, SRS, ports and a first rank indicator, RI, value. The first number of SRS ports is less than an actual number of SRS ports usable by the wireless device 22 for a first upcoming communication, and the first RI value is less than an actual RI value associated with a first measurement of the wireless device 22, as described herein. The network node 16 is further configured to reduce (Block S140) a number of the plurality of MIMO layers for the first upcoming communication in response to the indication of one of the first number of SRS ports and the first RI value. The indication of one of the first number of SRS ports and the first RI value is associated with a condition related to one of energy consumption and overheating existing at the wireless device 22, as described herein.

According to one or more embodiments, the processing circuitry 68 is further configured to receive an indication of one of an actual number of SRS ports usable by the wireless device 22 for a second upcoming communication and an actual RI value determined by the wireless device 22 based on a second measurement. The indication of the one of the actual number of SRS ports and the actual RI value is based on the condition no longer existing at the wireless device 22. According to one or more embodiments, the processing circuitry 68 is further configured to receive an indication of the overheating condition via User Equipment Assistance Information, UAI. The UAI is associated with a prohibit timer that, while running, is configured to prevent communication that one of the overheating condition is no longer detected and the overheating condition still detected. The indication of one of the first number of SRS ports and the first RI value is received separately from the UAI and while the prohibit timer is running.

According to one or more embodiments, the processing circuitry 68 is further configured to receive an indication of one of a second number of SRS ports less than an actual number of SRS ports usable by the wireless device 22 for the first upcoming communication and a second RI value less than an actual RI value associated with a first measurement of the wireless device 22. The processing circuitry 68 is further configured to configure a first component carrier based on the one of the first number of SRS ports and a first RI value and configure a second component carrier based on the one of the second number of SRS ports and a second RI value. The second component carrier is different from the first component carrier and configured to consume more energy than the first component carrier. In one example, the hardware specifics of the wireless device 22 may be such that some specific carriers are more energy consuming than others on the battery of the wireless device 22. The one of the second number of SRS ports and the second RI value is less than one of the first number of SRS ports and the first RI value. In one example, the first RI value is 1 or 2 while the second RI value is 2 or 3.

According to one or more embodiments, the processing circuitry 68 is further configured to schedule a Physical Uplink Shared Channel, PUSCH, transmission for the wireless device 22. The processing circuitry 68 is further configured to one of fail to receive the scheduled PUSCH transmission and receive a PUSCH transmission that has been adapted from the scheduled PUSCH transmission based on the condition existing at the wireless device 22. The adapting of the scheduled PUSCH transmission corresponds to including a second PUSCH layer that includes a Demodulation Reference Signal, DMRS.

FIG. 11 is a flowchart of an example process in a wireless device 22 according to some embodiments of the present disclosure. One or more blocks described herein may be performed by one or more elements of wireless device 22 such as by one or more of processing circuitry 84 (including the reporting unit 34), processor 86, radio interface 82 and/or communication interface 60. Wireless device 22 is configured to detect (Block S142) a condition related to one of energy consumption and overheating at the wireless device 22, as described herein. Wireless device 22 is configured to cause (Block S144) one of SRS reporting on a first number of SRS ports where the first number of SRS ports is lower than a second number of SRS ports that are supported by the wireless device and rank indicator, RI, reporting that indicates a first rank where the first rank is lower than a second rank measured by the wireless device 22, as described herein.

According to one or more embodiments, the processing circuitry 84 is further configured to determine the detected condition no longer exists, and cause one of SRS reporting the second number of SRS ports and RI reporting a rank measured by the wireless device 22. According to one or more embodiments, one of the SRS reporting and RI reporting occurs while a prohibit timer is running. According to one or more embodiments, the wireless device 22 remains in radio resource control, RRC, connected mode during the detected condition.

FIG. 12 is a flowchart of another example process in a wireless device 22 according to some embodiments of the present disclosure. One or more blocks described herein may be performed by one or more elements of wireless device 22 such as by one or more of processing circuitry 84 (including the reporting unit 34), processor 86, radio interface 82 and/or communication interface 60. Wireless device 22 is configured to detect (Block S146) a condition related to one of energy consumption and overheating at the wireless device 22, as described herein. Wireless device 22 is configured to, in response to the detected condition, indicate (Block S148) one of a first number of sounding reference signal, SRS, ports and a first rank indicator, RI, value, as described herein. The first number of SRS ports is less than an actual number of SRS ports usable by the wireless device 22 for a first upcoming communication. The first RI value is less than an actual RI value determined by the wireless device 22 based on a first measurement.

According to one or more embodiments, the indication of one of the first number of SRS ports and the first RI value is configured to cause the network node 16 to reduce a number of the plurality of MIMO layers for the first upcoming communication without the indication of one of the first number of SRS ports and the first RI value notifying the network node 16 of the detected condition.

According to one or more embodiments, the processing circuitry 84 is further configured to determine that the detected condition no longer exists, and in response at least to determining that the detected condition no longer exists, indicate one of an actual number of SRS ports usable by the wireless device 22 for a second upcoming communication and an actual RI value determined by the wireless device 22 based on a second measurement.

According to one or more embodiments, the wireless device 22 is configured to remain in radio resource control, RRC, connected mode as long as the condition persists.

According to one or more embodiments, the processing circuitry 84 is further configured to indicate the overheating condition to the network node 16 via User Equipment Assistance Information, UAI, and trigger a prohibit timer based on the indication of the overheating condition via UAI. While running, the prohibit timer is configured to prohibit the wireless device 22 from indicating one of that the overheating condition is no longer detected and the overheating condition is still detected. The indication of one of the first number of SRS ports and the first RI value is transmitted separately from the UAI and while the prohibit timer is running.

According to one or more embodiments, the processing circuitry 84 is further configured to indicate one of a second number of SRS ports less than an actual number of SRS ports usable by the wireless device 22 for the first upcoming communication and a second RI value less than an actual RI value determined by the wireless device 22 based on the first measurement. For example, the first RI value may be 1, the second RI value may be 2 and the actual RI value may be 4. The one of the first number of SRS ports and a first RI value is associated with a first component carrier. The one of the second number of SRS ports and a second RI value is associated with a second component carrier different from the first component carrier and less than the one of the first number of SRS ports and the first RI value. The second component carrier is configured to consume more energy than the first component carrier. In one example, the hardware specifics of the wireless device 22 may be such that some specific carriers are more energy consuming than others on the battery of the wireless device 22. In one example, the first RI value is 1 or 2 while the second RI value is 2 or 3.

According to one or more embodiments, the processing circuitry 84 is further configured to adapt at least one scheduled Physical Uplink Shared Channel, PUSCH, transmission based on the detected condition. The adapting of the at least one scheduled PUSCH transmission corresponding to one of omitting a PUSCH transmission and transmitting a second PUSCH layer that includes a Demodulation Reference Signal, DMRS, layer.

Having described the general process flow of arrangements of the disclosure and having provided examples of hardware and software arrangements for implementing the processes and functions of the disclosure, the sections below provide details and examples of arrangements for mitigating an overheating and/or excessive energy consumption condition.

One or more network node 16 functions described below may be performed by one or more of processing circuitry 68, processor 70, action unit 32, radio interface 62, etc. One or more wireless device 22 functions described below may be performed by one or more processing circuitry 84, processor 86, reporting unit 34, etc.

Some embodiments provide mitigating an overheating and/or excessive energy consumption condition. One or more embodiments described herein introduce methods for a wireless device 22 to mitigate a potential overheating condition or undesired excessive energy consumption condition. Such conditions may be exacerbated by the scheduling of a large number of MIMO layers by the network node 16 for the wireless device 22 in uplink (UL) or downlink (DL) while the wireless device 22 is in connected mode (e.g., radio resource control (RRC) connected mode), since the physical (PHY) layer processing as well as layer 2 (L2) processing typically scales with the number MIMO layers scheduled.

More specifically, in one or more embodiments, methods are defined to influence the network node 16 behavior related to MIMO scheduling of the wireless device. Note that the term network node 16 is used herein to denote various type of deployments, whether the deployment is NR standalone in which case the gNB of the connected cell(s) is the intended network node 16 including or not including carrier aggregation with one or more component carriers configured for the wireless device 22, or a dual carrier connection in which case the control may either be done through the Master Cell Group's or the Secondary Cell Group's gNBs.

Hence, a method is defined in the wireless device 22 in which, upon detection of a condition related to energy consumption or overheating, the wireless device 22 adapts/changes/modifies the SRS transmission and/or reported RI to the network node 16. The adaptation is such that upon detection of condition of overheating or excessive energy consumption, the wireless device 22 reports to the network node 16 a lower rank indication (RI) (e.g., Rank 1 or RI value of 1) as part of the CSI report than what the wireless device 22 has determined would be suitable for optimal DL performance. For instance, the wireless device 22 may have based on measurements of the CSI-RS determined that the channel quality is such that rank-4 transmission can be carried over the channel and would result in the highest DL throughput. Typically, in such a case, the wireless device 22 would report a RI indicating rank-4 (e.g., RI value of 4); however, in one or more embodiments described herein, the wireless device 22 would instead report a RI indicating another rank such as rank-1 (e.g., RI value of 1).

Furthermore, if configured by the network node 16 to transmit SRS, upon detection of a condition of overheating or excessive energy consumption, the wireless device 22 transmits SRS on fewer antenna ports (e.g., first number of SRS ports) than actually configured (e.g., second number of SRS ports are configured). Transmission on fewer antenna ports may for example be achieved by muting transmission on one or more antenna ports.

If reciprocity-based beamforming is used, the wireless device 22 is configured with a number of SRS resources including a set of SRS ports. Depending on the exact configuration of SRS antenna switching, e.g., 1T4R, 2T4R, 1T2R, 4T4R etc., different number of resources are used (in accordance with how the 3GPP specification is defined, for example). For instance, with 1T4R, the wireless device 22 is configured with four SRS resources, each with one SRS port, while for 2T4R, the wireless device 22 is configured with two SRS resources each with 2 SRS ports. Regardless, the sum of the ports across all SRS resources with usage-antennaSwitching sums up to the number of Rx antennas the wireless device 22 is equipped with. If or upon the wireless device 22 detecting the condition of overheating, the wireless device 22 may, for example, mute all but one of the SRS ports. For instance, for a 1T4R SRS tx switching configuration, the wireless device 22 would only transmit one of the configured SRS resources (port 0) and mute the remaining three SRS resources (including ports 1,2,3).

As a result, the wireless device 22 may influence the network node 16, since the network node 16 may have a rank determination procedure that monitors the signal strength of the SRS ports, to adapt the MIMO layer scheduling to a lower number which in turn allows the wireless device 22 to stop/reduce processing on one or more transceiver chains, thereby saving wireless device 22 energy and lowering its temperature.

In one aspect of the disclosure, the wireless device 22 may choose to activate the above behavior only occasionally or sometimes during overheating or energy saving conditions. For example, the wireless device 22 may note that the network node 16 configures the UAI (UE Assistance Information) framework, and that the network node 16 does follow the wireless device 22 suggested behavior for adapting the number of MIMO layers. For example, the network node 16 might historically have not implemented such behavior but after an upgrade started to support the UAI framework. Hence, in such condition, the wireless device 22 may omit above tampering with the adaptation of the RI reporting or muting of SRS transmission ports.

In another aspect, the wireless device 22 may choose to both use the UAI framework and the RI/SRS adaptation mechanisms together. For example, the wireless device 22 may choose to initially ask/request for assistance via the UAI framework and suggest a specific action such as reducing number of component carriers, but as a result of a prohibit timer, the wireless device 22 may not be allowed to further use the UAI framework during the time the timer is running. The wireless device 22 may then use the RS/SRS adaptation methods, described herein, during the course of the running prohibit timer.

In one embodiment, the wireless device 22 during the overheating/energy saving conditions performs one or more of the above steps differently for different component carriers in case of carrier aggregation and/or dual connectivity. That is, the wireless device 22 may choose to report different ranks or transmission on different number of ports for the different component carriers. For example, the hardware specifics of the wireless device 22 may be such that some specific carriers are more energy consuming than others, e.g., some specific carriers consume more energy of the battery of the wireless device 22 than others. Hence, for the energy consuming carriers, the wireless device 22 may choose a more aggressive behavior (e.g., Rank=1, SRS on single port) compared to other carriers (e.g., Rank=2, SRS on 2 ports).

The network node 16 may also use the DMRS transmitted by the wireless device 22 as an input for deciding the number of layers. Hence, in another embodiment, the wireless device 22 may upon detecting of the condition of overheating/energy saving, decide to adapt the PUSCH transmission. As such, even if the wireless device 22 is scheduled with a UL transmission rank of TRI=2 by the network node 16, the wireless device 22 may simply not prepare or transmit the second PUSCH layer (including the PUSCH DMRS of that layer) in hope of that the network node 16 will detect that the signal energy of the second layer PUSCH DMRS is low and adapt the wireless device's rank selection to rank-1.

One or more embodiments described above may be dynamic, and when the wireless device 22 changes back its energy saving/overheating condition to not being overheated or not need energy savings, and/or when there is a surge of traffic, the wireless device 22 behavior mentioned during the conditions fall back to the original or previous or network node 16 configured wireless device 22 behavior when the conditions were not met. That is, the wireless device 22 falls back to reporting the actual measured rank and transmitting SRS on actual supported/available number of ports and prepares/transmits PUSCH according to actual number of UL layers scheduled by the network node 16. Such adaptation may take place during the course of a UAI framework prohibit timer running.

Figure 13:
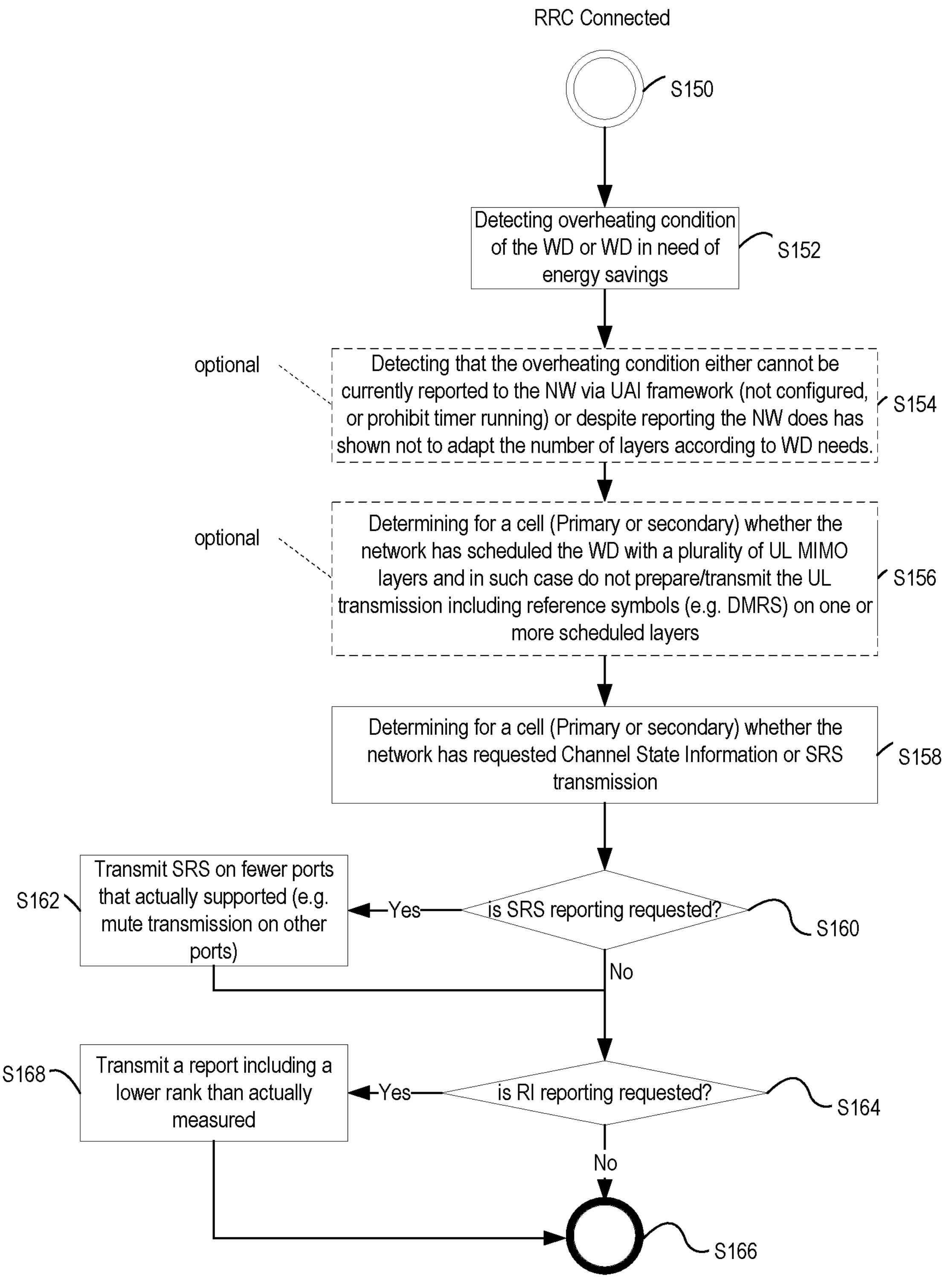
FIG. 13 is a flowchart of another example process in a wireless device according to some embodiments of the present disclosure.

FIG. 13 is a flow diagram of an example wireless device 22 behavior while overheating or need for energy saving is detected. After mitigation, the wireless device 22 goes back to regular reporting, including actual rank value (e.g., second rank value) and SRS and PUSCH transmission on actual number of ports and layers (e.g., second number of ports and layers). Wireless device 22 is configured to enter (Block S150) RRC connected mode. Wireless device 22 is configured to detect (Block S152) overheating condition of the wireless device 22 or that the wireless device 22 needs energy savings. Wireless device 22 is optionally configured to detect (Block S154) that the overheating condition either cannot be currently reported to the network node 16 via UAI framework (not configured or prohibit timer running) or despite reporting the network node 16 does not adapt the number of layers according to the wireless device 22 needs.

Wireless device 22 is optionally configured to determine (Block S156) for a cell (primary or secondary) whether the network node has scheduled the wireless device 22 with a plurality of UL MIMO layers and in such case do not prepare/transmit the uplink (UL) transmission including reference symbols (e.g., DMRS) on one or more scheduled layers. Wireless device 22 is configured to determine (Block S158) for a cell (primary or secondary) whether the network node 16 has requested channel state information (CSI) or SRS transmission. If SRS reporting has been requested (Block S160), wireless device 22 is configured to transmit (Block S162) SRS on fewer ports that actually supported (e.g., mute transmission on other ports).

If SRS reporting has not been requested (Block S160), wireless device 22 is configured to determine (Block S164) if RI reporting has been requested. If RI reporting has not been requested, the process may end (Block S166). However, if RS reporting has been requested, wireless device 22 is configured to transmit (Block S168) a report including a lower rank than actually measured.

SOME NON-LIMITING EXAMPLES

Example 1. A method in a wireless device 22 in which upon detection of a condition related to energy consumption or overheating, the wireless device 22 adapts the SRS transmission scheme and/or reported RI to the network node 16.

Example 2. The method of Example 1, wherein upon detection of the condition of overheating or excessive energy consumption, the wireless device 22 reports to the network node 16 a lower rank (e.g., Rank 1) than actually measured.

Example 3. The method of Example 1, wherein upon detection of the condition of overheating or excessive energy consumption, the wireless device 22 transmits to the network node 16 SRS on fewer ports (e.g., by muting transmission on other ports) than actually available.

Example 4. The method of Example 1, wherein upon detection of the condition of overheating or excessive energy consumption, determining for a cell (Primary or secondary) whether the network node 16 has scheduled the wireless device 22 with a plurality of UL MIMO layers and in such case do not prepare/transmit the UL transmission including reference symbols (e.g., DMRS) on one or more scheduled layers.

Example 5. The method of any one of Examples 1-3, wherein upon detection of condition in which the wireless device 22 is no longer overheated or no longer in need of energy savings, the wireless device 22 reports to the network node 16 the actual measured rank or transmits SRS on actual supported ports.

Example 6. The method of any one of Examples 1-4, wherein the wireless device 22 during the overheating/energy saving conditions performs the above steps differently for different component carriers in case of carrier aggregation and/or dual connectivity. That is, the wireless device 22 may choose to report different ranks or transmission on a different number of ports for the different component carriers.

Example 7. The method of any one of Examples 1-5, wherein the wireless device 22 may choose to only occasionally (even though overheated) carry out one or more of these steps. That is, the wireless device 22 may choose not to perform the steps despite being overheated in case the network node 16 has (at the occasion the wireless device 22 needs adaptation) shown to support wireless device 22 overheating/energy saving through other mechanisms such the UAI framework.

SOME ADDITIONAL EXAMPLES

Example A1. A network node 16 configured to communicate with a wireless device 22 (WD 22), the network node 16 configured to, and/or comprising a radio interface 62 and/or comprising processing circuitry 68 configured to:

receive one of:

a sounding reference signal, SRS, reporting on a first number of SRS ports, the first number of SRS ports being lower than a second number of SRS ports that are supported by the wireless device 22; and a rank indicator, RI, reporting that indicates a first rank, the first rank being lower than a second rank measured by the wireless device 22; and perform at least one action based at least on one of the SRS reporting and RI reporting.

Example A2. The network node 16 of Example A1, wherein the at least one action includes modifying a number of configured multiple-input multiple output, MIMO, layers. For example, modifying a number of configured MIMO layers may correspond to reducing an existing and/or current number of configured MIMO layers.

Example A3. The network node 16 of Example A1, wherein the network node 16 remains connected to the wireless device 22 via radio resource control, RRC, connected mode after receiving the one of SRS reporting and RI reporting.

Example B1. A method implemented in a network node 16, the method comprising:

receiving one of:

a sounding reference signal, SRS, reporting on a first number of SRS ports, the first number of SRS ports being lower than a second number of SRS ports that are supported by the wireless device 22; and a rank indicator, RI, reporting that indicates a first rank, the first rank being lower than a second rank measured by the wireless device 22; and performing at least one action based at least on one of the SRS reporting and RI reporting.

Example B2. The method of Example B1, wherein the at least one action includes modifying a number of configured multiple-input multiple output, MIMO, layers.

Example B3. The method of Example B1, wherein the network node 16 remains connected to the wireless device 22 via radio resource control, RRC, connected mode after receiving the one of SRS reporting and RI reporting.

Example C1. A wireless device 22 (WD 22) configured to communicate with a network node 16, the WD 22 configured to, and/or comprising a radio interface 62 and/or processing circuitry 68 configured to:

detect a condition related to one of energy consumption and overheating at the wireless device 22;

cause one of:

SRS reporting on a first number of SRS ports, the first number of SRS ports being lower than a second number of SRS ports that are supported by the wireless device 22; and rank indicator, RI, reporting that indicates a first rank, the first rank being lower than a second rank measured by the wireless device 22.

Example C2. The WD 22 of Example C1, wherein the processing circuitry 68 is further configured to:

determine the detected condition no longer exists; and cause one of:

SRS reporting the second number of SRS ports; and

RI reporting a rank measured by the wireless device 22.

Example C3. The WD 22 of Example C1, wherein one of the SRS reporting and RI reporting occurs while a prohibit timer is running.

Example C4. The WD 22 of any one of Examples C1-C3, wherein the wireless device 22 remains in radio resource control, RRC, connected mode during the detected condition.

Example D1. A method implemented in a wireless device 22 (WD 22), the method comprising:

detecting a condition related to one of energy consumption and overheating at the wireless device 22; and causing one of:

SRS reporting on a first number of SRS ports, the first number of SRS ports being lower than a second number of SRS ports that are supported by the wireless device 22; and rank indicator, RI, reporting that indicates a first rank, the first rank being lower than a second rank measured by the wireless device 22.

Example D2. The method of Example D1, further comprising:

determining the detected condition no longer exist; and causing one of:

SRS reporting the second number of SRS ports; and

RI reporting a rank measured by the wireless device 22.

Example D3. The method of Example D1, wherein one of the SRS reporting and RI reporting occurs while a prohibit timer is running.

Example D4. The method of any one of Examples D1-D3, wherein the wireless device 22 remains in radio resource control, RRC, connected mode during the detected condition.

In one or more embodiments, using the disclosed methods, the wireless device 22 may influence the network node 16 to lower the number of configured MIMO layers (e.g., via adapting of the SRS transmission scheme and/or reported RI) and thereby mitigate an overheating condition while in connected mode without having to disconnect from the network node 16. The end user of wireless device 22 may still enjoy a connection even though at a lower data rate while the wireless device 22 is overheated.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device configured to communicate with a network node, the wireless device comprising:

processing circuitry configured to:

detect a condition related to one of energy consumption and overheating at the wireless device;

remain in a radio resource control (RRC) connected mode as long as the detected condition persists; and in response to the detected condition, indicate one of a first number of sounding reference signal (SRS) ports and a first rank indicator (RI) value;

the first number of SRS ports being less than an actual number of SRS ports usable by the wireless device for a first upcoming communication; and the first RI value being less than an actual RI value determined by the wireless device based on a first measurement.

2. The wireless device of claim 1, wherein the indication of one of the first number of SRS ports and the first RI value is configured to cause the network node to reduce a number of the plurality of multiple input-multiple output (MIMO) layers for the first upcoming communication without the indication of one of the first number of SRS ports and the first RI value notifying the network node of the detected condition.

3. The wireless device of claim 1, wherein the processing circuitry is further configured to:

determine that the detected condition no longer exists; and in response at least to determining that the detected condition no longer exists, indicate one of an actual number of SRS ports usable by the wireless device for a second upcoming communication and an actual RI value determined by the wireless device based on a second measurement.

4. The wireless device of claim 1, wherein the processing circuitry is further configured to:

indicate the overheating condition to the network node via User Equipment Assistance Information (UAI);

trigger a prohibit timer based on the indication of the overheating condition via UAI;

while running, the prohibit timer being configured to prohibit the wireless device from indicating one of that the overheating condition is no longer detected and the overheating condition is still detected; and the indication of one of the first number of SRS ports and the first RI value being transmitted separately from the UAI and while the prohibit timer is running.

5. The wireless device of claim 1, wherein the processing circuitry is further configured to:

indicate one of a second number of SRS ports less than an actual number of SRS ports usable by the wireless device for the first upcoming communication and a second RI value less than an actual RI value determined by the wireless device based on the first measurement;

the one of the first number of SRS ports and a first RI value being associated with a first component carrier; and the one of the second number of SRS ports and a second RI value being:

associated with a second component carrier different from the first component carrier; and less than the one of the first number of SRS ports and the first RI value, the second component carrier configured to consume more energy than the first component carrier.

6. The wireless device of claim 1, wherein the processing circuitry is further configured to adapt at least one scheduled Physical Uplink Shared Channel (PUSCH) transmission based on the detected condition, the adapting of the at least one scheduled PUSCH transmission corresponding to one of omitting a PUSCH transmission and transmitting a second PUSCH layer that includes a Demodulation Reference Signal (DMRS) layer.

7. A method implemented by a wireless device that is configured to communicate with a network node, the method comprising:

detecting a condition related to one of energy consumption and overheating at the wireless device;

remaining in a radio resource control (RRC) connected mode as long as the detected condition persists; and in response to the detected condition, indicating one of a first number of sounding reference signal (SRS) ports and a first rank indicator (RI) value;

the first number of SRS ports being less than an actual number of SRS ports usable by the wireless device for a first upcoming communication; and the first RI value being less than an actual RI value determined by the wireless device based on a first measurement.

8. The method of claim 7, wherein the indication of one of the first number of SRS ports and the first RI value is configured to cause the network node to reduce a number of the plurality of multiple input-multiple output (MIMO) layers for the first upcoming communication without the indication of one of the first number of SRS ports and the first RI value notifying the network node of the detected condition.

9. The method of claim 7, further comprising:

determining that the detected condition no longer exists; and in response at least to determining that the detected condition no longer exists, indicating one of an actual number of SRS ports usable by the wireless device for a second upcoming communication and an actual RI value determined by the wireless device based on a second measurement.

10. The method of claim 7, further comprising:

indicating the overheating condition to the network node via User Equipment Assistance Information (UAI);

triggering a prohibit timer based on the indication of the overheating condition via UAI;

while running, the prohibit timer being configured to prohibit the wireless device from indicating one of that the overheating condition is no longer detected and the overheating condition is still detected; and the indication of one of the first number of SRS ports and the first RI value being transmitted separately from the UAI and while the prohibit timer is running.

11. The method of claim 7, further comprising:

indicating one of a second number of SRS ports less than an actual number of SRS ports usable by the wireless device for the first upcoming communication and a second RI value less than an actual RI value determined by the wireless device based on the first measurement;

the one of the first number of SRS ports and a first RI value being associated with a first component carrier; and the one of the second number of SRS ports and a second RI value being:

associated with a second component carrier different from the first component carrier; and less than the one of the first number of SRS ports and the first RI value, the second component carrier configured to consume more energy than the first component carrier.

12. The method of claim 7, further comprising adapting at least one scheduled Physical Uplink Shared Channel (PUSCH) transmission based on the detected condition, the adapting of the at least one scheduled PUSCH transmission corresponding to one of omitting a PUSCH transmission and transmitting a second PUSCH layer that includes a Demodulation Reference Signal (DMRS) layer.

13. A network node configured to communicate with a wireless device using a plurality of Multiple-Input Multiple-Output (MIMO) layers, the network node comprising:

processing circuitry configured to:

receive an indication of one of a first number of sounding reference signal (SRS) ports and a first rank indicator (RI) value, the first number of SRS ports being less than an actual number of SRS ports usable by the wireless device for a first upcoming communication, the first RI value being less than an actual RI value associated with a first measurement of the wireless device;

receive an indication of a detected condition related to one of energy consumption and overheating at the wireless device;

configure the wireless device to remain in a radio resource control (RRC) connected mode as long as the detected condition persists; and reduce a number of the plurality of MIMO layers for the first upcoming communication in response to the indication of one of the first number of SRS ports and the first RI value.

14. The network node of claim 13, wherein the processing circuitry is further configured to receive an indication of one of an actual number of SRS ports usable by the wireless device for a second upcoming communication and an actual RI value determined by the wireless device based on a second measurement; and the indication of the one of the actual number of SRS ports and the actual RI value being based on the condition no longer existing at the wireless device.

15. The network node of claim 13, wherein the processing circuitry is further configured to receive an indication of the overheating condition via User Equipment Assistance Information (UAI);

the UAI being associated with a prohibit timer that, while running, is configured to prevent communication that one of the overheating condition is no longer detected and the overheating condition still detected; and the indication of one of the first number of SRS ports and the first RI value being received separately from the UAI and while the prohibit timer is running.

16. The network node of claim 13, wherein the processing circuitry is further configured to:

receive an indication of one of a second number of SRS ports less than an actual number of SRS ports usable by the wireless device for the first upcoming communication and a second RI value less than an actual RI value associated with a first measurement of the wireless device;

configure a first component carrier based on the one of the first number of SRS ports and a first RI value;

configure a second component carrier based on the one of the second number of SRS ports and a second RI value, the second component carrier being:

different from the first component carrier; and configured to consume more energy than the first component carrier; and the one of the second number of SRS ports and the second RI value being less than one of the first number of SRS ports and the first RI value.

17. The network node of claim 13, wherein the processing circuitry is further configured to:

schedule a Physical Uplink Shared Channel (PUSCH) transmission for the wireless device; and one of fail to receive the scheduled PUSCH transmission and receive a PUSCH transmission that has been adapted from the scheduled PUSCH transmission based on the condition existing at the wireless device, the adapting of the scheduled PUSCH transmission corresponding to including a second PUSCH layer that includes a Demodulation Reference Signal (DMRS).

18. A method implemented by a network node that is configured to communicate with a wireless device using a plurality of Multiple-Input Multiple-Output (MIMO) layers, the method comprising:

receiving an indication of one of a first number of sounding reference signal (SRS) ports and a first rank indicator (RI) value, the first number of SRS ports being less than an actual number of SRS ports usable by the wireless device for a first upcoming communication, the first RI value being less than an actual RI value associated with a first measurement of the wireless device;

receiving an indication of a detected condition related to one of energy consumption and overheating at the wireless device;

configuring the wireless device to remain in a radio resource control (RRC) connected mode as long as the detected condition persists; and reducing a number of the plurality of MIMO layers for the first upcoming communication in response to the indication of one of the first number of SRS ports and the first RI value.

19. The method of claim 18, further comprising receiving an indication of one of an actual number of SRS ports usable by the wireless device for a second upcoming communication and an actual RI value determined by the wireless device based on a second measurement; and the indication of the one of the actual number of SRS ports and the actual RI value being based on the condition no longer existing at the wireless device.

20. The method of claim 18, further comprising receiving an indication of the overheating condition via User Equipment Assistance Information (UAI);

the UAI being associated with a prohibit timer that, while running, is configured to prevent communication that one of the overheating condition is no longer detected and the overheating condition still detected; and the indication of one of the first number of SRS ports and the first RI value being received separately from the UAI and while the prohibit timer is running.

21. The method of claim 18, further comprising:

receiving an indication of one of a second number of SRS ports less than an actual number of SRS ports usable by the wireless device for the first upcoming communication and a second RI value less than an actual RI value associated with a first measurement of the wireless device;

configuring a first component carrier based on the one of the first number of SRS ports and a first RI value;

configuring a second component carrier based on the one of the second number of SRS ports and a second RI value, the second component carrier being:

different from the first component carrier; and configured to consume more energy than the first component carrier; and the one of the second number of SRS ports and the second RI value being less than one of the first number of SRS ports and the first RI value.

22. The method of claim 18, further comprising:

scheduling a Physical Uplink Shared Channel (PUSCH) transmission for the wireless device; and one of failing to receive the scheduled PUSCH transmission and receiving a PUSCH transmission that has been adapted from the scheduled PUSCH transmission based on the condition existing at the wireless device, the adapting of the scheduled PUSCH transmission corresponding to including a second PUSCH layer that includes a Demodulation Reference Signal (DMRS).

* * * * *